United States Patent
Hassan et al.

(10) Patent No.: US 9,807,735 B2
(45) Date of Patent: Oct. 31, 2017

(54) CONNECTION INFORMATION FOR INTER-DEVICE WIRELESS DATA COMMUNICATION

(71) Applicant: Microsoft Technology Licensing, LLC, Redmond, WA (US)

(72) Inventors: Amer A. Hassan, Kirkland, WA (US); Billy R. Anders, Jr., Bothell, WA (US); Mitesh K. Desai, Sammamish, WA (US); Henry M. A. Filgueiras, Kirkland, WA (US); Mahmoud S. Elhaddad, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 696 days.

(21) Appl. No.: 13/674,675

(22) Filed: Nov. 12, 2012

(65) Prior Publication Data

US 2014/0133407 A1  May 15, 2014

(51) Int. Cl.
| | |
|---|---|
| H04W 4/00 | (2009.01) |
| H04W 72/04 | (2009.01) |
| H04W 76/02 | (2009.01) |
| H04W 28/16 | (2009.01) |

(52) U.S. Cl.
CPC ....... *H04W 72/0406* (2013.01); *H04W 76/02* (2013.01); *H04W 28/16* (2013.01)

(58) Field of Classification Search
CPC .................................................. H04W 72/04
See application file for complete search history.

(56) References Cited

U.S. PATENT DOCUMENTS

| | | | |
|---|---|---|---|
| 7,013,158 B1 | 3/2006 | Cook | |
| 7,260,357 B2 | 8/2007 | Hulvey | |
| 8,019,883 B1 | 9/2011 | Margulis | |
| 8,184,656 B2 | 5/2012 | Chandra et al. | |
| 2003/0060218 A1 | 3/2003 | Billerbeck et al. | |
| 2003/0219002 A1* | 11/2003 | Kishida | H04W 16/16 370/338 |

(Continued)

FOREIGN PATENT DOCUMENTS

| | | |
|---|---|---|
| CN | 101184007 | 5/2008 |
| CN | 101313527 | 11/2008 |

(Continued)

OTHER PUBLICATIONS

Pursley, et al., "Adaptation of Modulation, Coding, and Power for High-Rate Direct-Sequence Spread Spectrum", Retrieved at <<http://ieeexplore.ieee.org/stamp/stamp.jsp?tp=&arnumber=4086690>>, Proceedings of IEEE Military Communications Conference, MILCOM, Oct. 23, 2006, pp. 6.

Morosi, et al., "Higher Order Modulation IR-UWB Signals for Short-Range Communications", Retrieved at <<http://ieeexplore.ieee.org/stamp/stamp.jsp?tp=&arnumber=5758135>>, Proceedings of 12th European Wireless Conference—Enabling Technologies for Wireless Multimedia Communications (European Wireless), Apr. 2, 2006, pp. 6.

(Continued)

*Primary Examiner* — Nicholas Sloms

(57) ABSTRACT

Techniques for connection information for inter-device wireless data communication are described. In at least some embodiments, a broker device maintains wireless connection information for various wireless devices. The wireless connection information includes wireless channels at which particular wireless devices can be accessed. The broker device can provide the wireless connection information to various other devices to enable wireless communication with the wireless devices.

20 Claims, 6 Drawing Sheets

(56) References Cited

U.S. PATENT DOCUMENTS

| | | | |
|---|---|---|---|
| 2004/0116141 A1* | 6/2004 | Loven | H04W 72/00 455/519 |
| 2007/0104138 A1 | 5/2007 | Rudolf et al. | |
| 2007/0255798 A1* | 11/2007 | Schneider | G06F 9/5077 709/217 |
| 2010/0069074 A1* | 3/2010 | Kodialam | H04W 4/20 455/450 |
| 2011/0189999 A1 | 8/2011 | Mueck | |
| 2011/0317636 A1* | 12/2011 | Diachina | H04W 74/0833 370/329 |
| 2012/0106381 A1 | 5/2012 | Vedantham et al. | |
| 2012/0140733 A1* | 6/2012 | Jung | H04W 36/0077 370/331 |
| 2012/0147777 A1* | 6/2012 | Arashin | H04W 72/02 370/252 |
| 2012/0163309 A1* | 6/2012 | Ma | H04B 7/2606 370/329 |
| 2012/0257245 A1 | 10/2012 | Mccoog et al. | |

FOREIGN PATENT DOCUMENTS

| | | |
|---|---|---|
| CN | 102428748 | 4/2012 |
| WO | 2008/060071 A1 | 5/2008 |

OTHER PUBLICATIONS

Saxena, et al., "Pairing Devices with Good Quality Output Interfaces", Retrieved at <<http://ieeexplore.ieee.org/stamp/stamp.jsp?tp=&arnumber=4577814>>, Proceedings of 28th International Conference on Distributed Computing Systems Workshops, Jun. 17, 2008, pp. 6.

"International Search Report & Written Opinion for PCT Patent Application No. PCT/US2013/069622", dated May 16, 2014, Filed Date: Nov. 12, 2013, 16 Pages.

"Foreign Office Action", CN Application No. 201380070152.2, Feb. 3, 2017, 20 pages.

"Foreign Office Action", EP Application No. 13795143.0, dated Dec. 16, 2016, 8 pages.

\* cited by examiner

| Resource ID | Resource Type | Channel(s) | Polling Interval |
|---|---|---|---|
| 987gr6H7h... | Wireless Keyboard | 3 | 500ms |
| 7624-1A0B-F3... | Wireless Mouse | 1, 3 | 1s |
| 01-23-45-67-89-ab | Printer | 6 | 250ms |
| G67QQ4R-80... | Wireless Touch Pad | 11 | 250ms |
| a1B2-5R47... | Display Device | 1 | 500ms |
| 09-ol8-ZZ... | Audio Device | 14 | 125ms |
| [ · · · ] | [ · · · ] | [ · · · ] | [ · · · ] |

Fig. 4

CONNECTION INFORMATION FOR INTER-DEVICE WIRELESS DATA COMMUNICATION

BACKGROUND

Many devices today utilize some form of wireless data communication. While a variety of different types of wireless data communication exist, radio frequency (RF) communication is pervasive. Examples of RF communication include cellular networks (e.g., for cell phones), Wi-Fi®, broadcast television, global positioning system (GPS) navigation, and so forth.

RF data communication can be particularly useful to facilitate inter-device communication. For instance, a wireless input/output (I/O) device (e.g., a mouse, a touchpad, a keyboard, and so on) can communicate with a computer utilizing various forms of RF communication. This can enable a user to provide input to a computer independent of a wired connection between an input device and the computer.

In utilizing RF communication for battery powered devices (e.g., a wireless mouse, a wireless keyboard, and so on), power management is a prominent consideration. For example, longer effective battery charge life can be realized by reducing the amount of power utilized for RF communication. Certain RF communication protocols, however, can be power-intensive. Thus, reducing power usage when employing such protocols presents a number of challenges.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for connection information for inter-device wireless data communication are described. In at least some embodiments, a broker device maintains wireless connection information for various wireless devices. The wireless connection information includes wireless channels at which particular wireless devices can be accessed. The broker device can provide the wireless connection information to various other devices to enable wireless communication with the wireless devices. For instance, the broker device can provide the wireless connection information in response to a query from a device for the information. Alternatively or additionally, the broker device can provide the wireless connection information independent of such a query, such as via a proactive notification that includes the information.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 4 illustrates an example resource table for tracking wireless resources in accordance with one or more embodiments.

DETAILED DESCRIPTION

Overview

Figure 1:
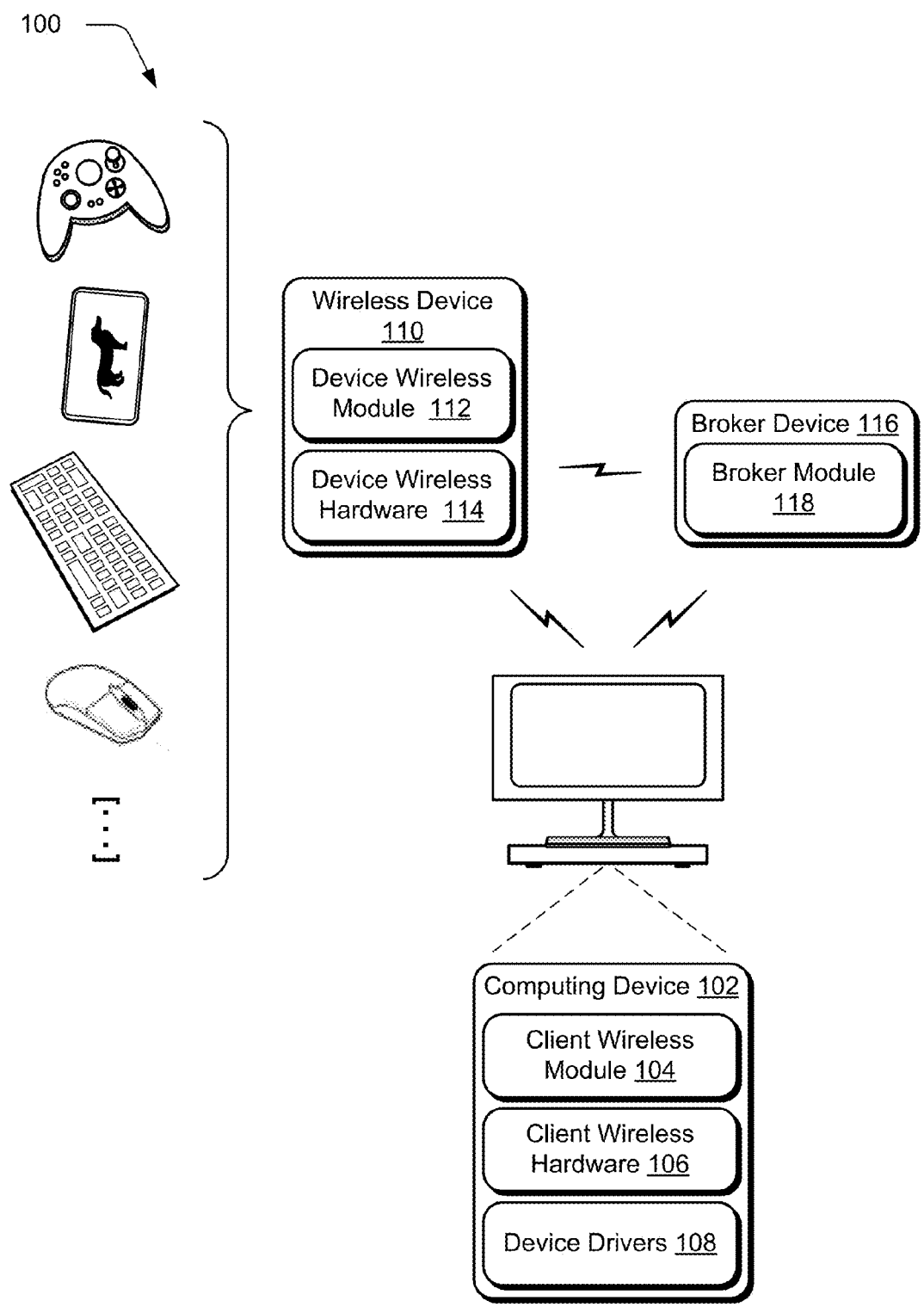
FIG. 1 is an illustration of an environment in an example implementation that is operable to employ techniques discussed herein in accordance with one or more embodiments.

Techniques for connection information for inter-device wireless data communication are described. In at least some embodiments, a broker device maintains wireless connection information for various wireless devices. The wireless connection information includes wireless channels at which particular wireless devices can be accessed. The broker device can provide the wireless connection information to various other devices to enable wireless communication with the wireless devices. For instance, the broker device can provide the wireless connection information in response to a query from a device for the information. Alternatively or additionally, the broker device can provide the wireless connection information independent of such a query, such as via a proactive notification that includes the information.

For instance, consider a scenario where a wireless device (e.g., a wireless mouse) is configured to communicate via a particular wireless channel and/or set of wireless channels. The wireless device can notify a broker entity of the channel and/or channels, as well as other information concerning wireless communication parameters for the wireless device. The broker entity can provide the wireless connection information, including identifiers for the channels, to a client device, e.g., a laptop computer, a desktop computer, a tablet computer, and so on. The client device can utilize the wireless connection information to communicate data wirelessly with the wireless device via the channel(s). In at least some implementations, the client device can utilize the channel(s) to establish a direct wireless connection with the wireless device, such as independent of an intermediary device or network.

In at least some implementations, data communication between a client device and a wireless device can be implemented via a direct wireless local area network (WLAN) connection between the wireless device and the client device. The WLAN, for example, can be implemented by the client device according to the 802.11 Standards for wireless data communication managed by the Institute of Electrical and Electronics Engineers (IEEE). The 802.11 Standards are often referred to as "Wi-Fi®", but are referenced herein as WLAN.

Typically, the WLAN standards specify particular channel frequency bands which wireless devices may utilize to communicate. Examples of these frequency bands include 2.4 gigahertz (GHz), 3.6 GHz, 5 GHz, and so on. Further, a particular frequency band can be split into multiple channels that can each be used to transmit signals. For instance, a frequency band can be divided into multiple non-overlapping channels that can be selected from for transmitting and/or receiving signals. In at least some implementations, the channels can correspond to 20 megahertz (MHz)-wide divisions of a particular frequency band.

A channel can be further divided into multiple sub-channels (e.g., carrier signals) that can be individually utilized to transmit and/or receive signals. For instance, a 20 MHz-wide channel (e.g., in one of the frequency bands mentioned above) can be split into 52 sub-channels that can each be used to transmit and receive RF signals. In implementations that utilize signal modulation, such as orthogonal frequency division multiplexing (OFDM), some of the sub-channels may be utilized for transmitting data, while others may be utilized for error correction. For instance, in implementations that apply OFDM to 52 sub-channels, 48 of the sub-channels may be utilized to transmit and receive data, while 4 of the sub-channels may be utilized for error correction. This allocation of available sub-channels is presented for purpose of example only, and implementations may allocate available sub-channels for a wide variety of different tasks and/or purposes. Thus, as used herein the term "channel" may refer to a particular channel, set of channels, sub-channel, and/or set of sub-channels.

In at least some embodiments, a wireless connection between a client device and a wireless device can be established according to a pre-specified subset of sub-channels. For instance, a wireless device can be configured to transmit data using a pre-specified channel and/or set of channels. Thus, a client device can be notified of the channel(s) (e.g., by a broker entity) to enable wireless data communication with the wireless device. Alternatively or additionally, the channel(s) can be assigned for wireless data communication with the wireless device, such as by the broker entity.

In the following discussion, an example environment is first described that is operable to employ techniques described herein. Next, a section entitled "Example Implementation Scenarios" describes some implementation scenarios involving techniques discussed herein which may be employed in the example environment as well as in other environments. Finally, a section entitled "Example System and Device" describes an example system and device that are operable to employ techniques discussed herein in accordance with one or more embodiments.

Example Environment

FIG. 1 is an illustration of an environment 100 in an example implementation that is operable to employ techniques for connection information for inter-device wireless data communication. Environment 100 includes a computing device 102 which can be embodied as any suitable computing device such as, by way of example and not limitation, a desktop computer, a portable computer (e.g., a laptop), a handheld computer such as a personal digital assistant (PDA), a tablet computer, and so forth. One of a variety of different examples of a computing device 102 is shown and described below in FIG. 6.

The computing device 102 of FIG. 1 is illustrated as including a client wireless module 104, which is representative of functionality to enable the computing device 102 to communicate wirelessly with other devices and/or entities. The client wireless module 104 can be configured to enable data communication via a variety of different wireless techniques and protocols. Examples of such techniques and/or protocols include cellular communications (e.g. 2G, 3G, 4G, and so forth), near field communication (NFC), short-range wireless connections (e.g., Bluetooth), local area wireless networks (e.g., one or more standards in compliance with IEEE 802.11), wide area wireless networks (e.g., one or more standard in compliance with IEEE 802.16), wireless telephone networks, and so on. For instance, the client wireless module 104 is configured to employ techniques for connection information for inter-device wireless data communication discussed herein.

The computing device 102 further includes client wireless hardware 106, which is representative of various hardware components that can be employed to enable the computing device 102 to communicate wirelessly. Examples of the client wireless hardware 106 include a radio transmitter, a radio receiver, various types and/or combinations of antennas, impedance matching functionality, and so on.

Further included as part of the computing device 102 are one or more device drivers 108, which are representative of functionality to enable the computing device 102 to interact with various devices, and vice-versa. For instance, the device drivers 108 can enable various functionalities of the computing device 102 (e.g., an operating system, applications, services, and so on) to interact with different devices, such as input/output (I/O) devices associated with the computing device 102. Further, the device drivers 108 can enable devices (e.g., I/O devices) associated with the computing device 102 to interact with various functionalities of the computing device 102.

The environment 100 further includes a wireless device 110, which is representative of a variety of different devices that are configured to communicate wirelessly with the computing device 102. Examples of the wireless device 110 include a mouse, a keyboard, a game controller, a touchpad, an audio output device, a video display device, a sensor, a camera, and so on. These examples are presented for purpose of illustration only, and a wide variety of other device types and/or instances may be employed within the spirit and scope of the claimed embodiments.

The wireless device 110 includes a device wireless module 112, which is representative of functionality to enable wireless data communication, e.g., according to techniques for connection information for inter-device wireless data communication discussed herein. For instance, the device wireless module 112 can enable the wireless device 110 to communicate wirelessly with the computing device 102, such as via data communication between the device wireless module 112 and the client wireless module 104. The device wireless module 112 can be configured to enable data communication via a variety of different wireless techniques and/or protocols, examples of which are referenced above and below.

Further included as part of the wireless device 110 is device wireless hardware 114, which is representative of various hardware components that can be employed to enable the wireless device 110 to communicate wirelessly. Examples of the device wireless hardware 114 include a radio transmitter, a radio receiver, various types and/or combinations of antennas, impedance matching functionality, and so on.

According to implementations discussed herein, techniques can be employed to establish wireless data communication between the wireless device 110 and the computing device 102 utilizing a variety of different wireless data communication techniques and/or protocols. For instance, with reference to the 802.11 standards discussed above, techniques can be employed to enable direct wireless data communication between the wireless device 110 and the computing device 102 via a WLAN connection between the devices, e.g., independent of a separate access point to manage a WLAN connection between the devices.

One example way of establishing and maintaining a WLAN connection between the wireless device 110 and the computing device 102 utilizes portions of the Wi-Fi Direct™ protocol established and managed by IEEE. For instance, the computing device 102 and/or the wireless device 110 can be configured to communicate via the Wi-Fi Direct™ protocol, such as via the exchange of Wi-Fi Direct™ compliant data packets. Thus, in at least some implementations, techniques for connection information for inter-device wireless data communication discussed herein can be employed in the context of Wi-Fi Direct™ data communication between devices, such as between the computing device 102 and the wireless device 110. This is not intended to be limiting, however, and a wide variety of different wireless techniques and protocols may be utilized in accordance with the disclosed embodiments. Further, while certain aspects of established wireless protocols (e.g., 802.11, Wi-Fi Direct™, and so on) may be utilized in tandem with techniques discussed herein to enable wireless data communication between devices, techniques discussed herein are inventive and are not to be considered part of these protocols as they currently exist.

The environment 100 further includes a broker device 116, which includes and/or makes use of a broker module 118. The broker device 116 can be configured as any suitable device and/or combination of devices, such as a computing device, a server, a wireless router, and so on. The broker module 118 is representative of functionality to manage wireless services for different devices, such as the computing device 102, the wireless device 110, and so on. For instance, the broker module 118 can track wireless connection information for different devices, and can propagate the information among devices to enable wireless data communication between devices. The broker module 118 can implement a variety of other wireless-related functionalities, examples of which are discussed below.

For purpose of illustration, the environment 100 is discussed with reference to wireless data communication between a single wireless device 110 and the computing device 102. However, embodiments discussed herein may be employed to generate and manage wireless connections between more than two devices. For instance, the broker device 116 can utilize techniques discussed herein to enable wireless data communication among multiple different wireless devices and/or sets of wireless devices. Further, data communication between the computing device 102 and multiple wireless devices can be managed via virtual (e.g., logical) connections to the wireless devices. The computing device 102 can employ various resource scheduling techniques and/or algorithms to manage virtual connections with multiple wireless devices. Examples of such resource scheduling techniques include round-robin scheduling, serial scheduling, priority-based scheduling, and so forth.

While the wireless device 110 is discussed herein as being configured to communicate wirelessly, this is not intended to be limiting. For instance, in at least some embodiments the wireless device 110 may be configured to communicate wirelessly with a particular device (e.g., the computing device 102), while be configured to communicate via a wired connection with a different device.

Although not expressly illustrated in FIG. 1, the environment 100 may include a network via which the computing device 102 and the wireless device 110 may communicate. Examples of such a network include a local area network (LAN), a wide area network (WAN), the Internet, and so on. Thus, the computing device 102 and the wireless device 110 may communicate with each other directly, and/or via one or more intermediary networks.

Having described an example environment in which the techniques described herein may operate, consider now a discussion of some example implementation scenarios in accordance with one or more embodiments.

Example Implementation Scenarios

The following discussion describes example implementation scenarios for connection information for inter-device wireless data communication in accordance with one or more embodiments. The implementation scenarios may be employed in the environment 100 of FIG. 1, and/or any other suitable environment.

Figure 2:
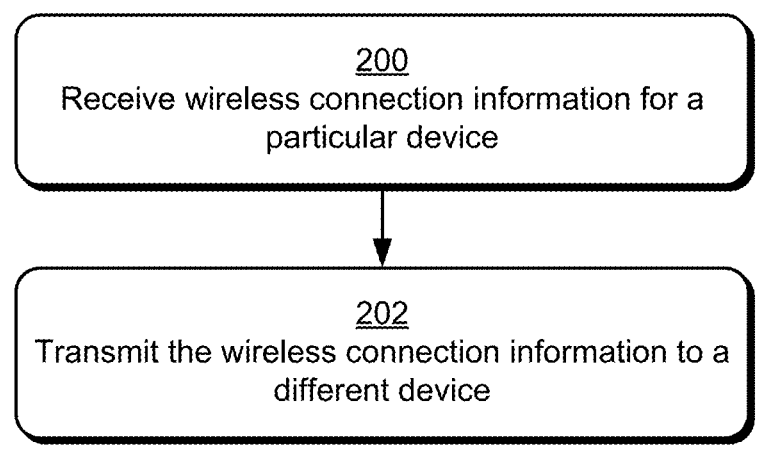
FIG. 2 is a flow diagram that describes steps in a method in accordance with one or more embodiments.

FIG. 2 is a flow diagram that describes steps in a method in accordance with one or more embodiments. Step 200 receives wireless connection information for a particular device. For instance, the wireless device 110 can communicate various information concerning its wireless communication parameters to the broker device 116. Such information can identify a channel and/or channels via which the wireless device 110 transmits and/or receives wireless data communication. Other types of information may also be specified, such as how frequently the wireless device 110 is transmitting data wirelessly and/or checking for wireless data transmission from another device. The information may also include a type of modulation used by the wireless device 110 (e.g., OFDM), a type of error correction coding used by the wireless device 110 (e.g., forward error correction (FEC)), and so forth.

Step 202 transmits the wireless connection information to a different device. For example, the broker device 116 can transmit the wireless connection information to the computing device 102. The wireless connection information can be transmitted in response to a query for the wireless connection information, such as from the computing device 102. Alternatively or additionally, the wireless connection information can be transmitted proactively, e.g., not in response to an express query for the wireless connection information. For instance, the broker device 116 can receive the wireless connection information for the wireless device 110, and in response can transmit to wireless connection information to the computing device 102.

As detailed herein, transmitting the wireless connection information can enable direct inter-device wireless data communication. The direct wireless data communication can occur independent of an intermediary entity, such as a wireless router, a wireless network, and so forth.

Figure 3:
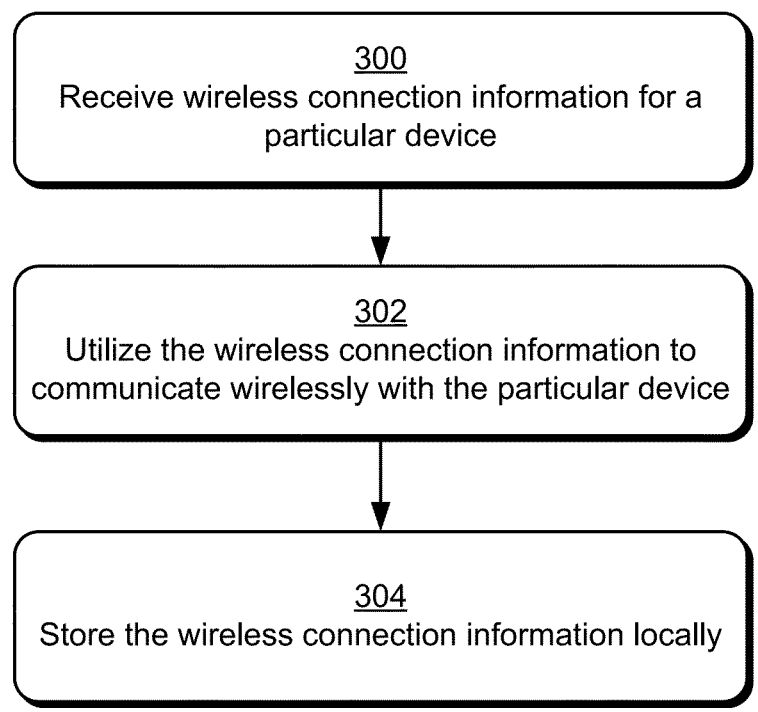
FIG. 3 is a flow diagram that describes steps in a method in accordance with one or more embodiments.

FIG. 3 is a flow diagram that describes steps in a method in accordance with one or more embodiments. Step 300 receives wireless connection information for a particular device. For instance, the computing device 102 can receive the wireless connection information from the broker device 116. The wireless connection information can be received in response to a query for the information, such as from the computing device 102 to the broker device 116. Alternatively or additionally, the wireless connection information can be received via an unsolicited transmission, such as a notification transmitted from the broker device 116 to the computing device 102.

The wireless connection information includes parameters for wireless communication with the particular device, such as a channel and/or channels that the particular device utilizes to transmit and/or receives wireless communication. Examples of other parameters are discussed above and below.

Step 302 utilizes the wireless connection information to communicate wirelessly with the particular device. The computing device 102, for example, can utilize the wireless connection information to establish direct wireless data communication with the wireless device 110. For instance, the computing device 102 can transmit a data packet to the wireless device 110 via a wireless channel and/or channels identified in the wireless connection information. Various types of data packets may be utilized, such as a request packet, a response packet, and so on. Thus, the computing device 102 can communicate wirelessly with the wireless device 110 via a channel and/or channels identified in the wireless connection information.

Step 304 stores the wireless connection information locally. For example, the wireless connection information can be stored locally such that subsequent wireless communication sessions with the particular device can be established, e.g., independent of receiving the wireless connection information from an external source. The computing device 102, for instance, can store wireless connection information for the wireless device 110 locally on the computing device 102. Thus, the computing device 102 can access the locally stored wireless connection information to initiate wireless communication with the wireless device 110 for a subsequent communication session, such as a subsequent direct Wi-Fi® connection between the computing device 102 and the wireless device 110.

FIG. 4 illustrates a resource table 400 that can be employed to track wireless connection information for various resources. For instance, the broker device 116 can maintain the resource table 400, and can utilize information from the resource table 400 to inform other devices about wireless connection information for different resources.

Alternatively or additionally, the computing device 102 can store at least some portions of the resource table 400 locally, such as in association with the client wireless module 104. For instance, information from the resource table 400 can be propagated from the broker device 116 to the computing device 102. The computing device 102 can store the resource table 400 locally to enable the computing device 102 to communicate wirelessly with various resources via information stored in the resource table 400.

The resource table 400 includes a resource identifier (ID) column 402, which includes identifiers for particular resources. Examples of resources include instances of devices, categories of devices, services (e.g., data processing services, content services, and so forth), physical resources (e.g., a conference room), and so on. Various types of resource identifiers can be utilized, such as a media access control (MAC) address, an internet protocol (IP) address, an organizationally unique identifier (OUI), and so forth. Thus, in at least some embodiments an ID indicated in the resource ID column 402 can identify a particular instance of a resource and/or a particular category of resource.

Further illustrated is a resource type column 404, which specifies different types of resources for which wireless connection information can be tracked in accordance with various embodiments. A channel column 406 specifies wireless channels and/or sub-channels at which particular resources can be found. In at least some implementations, a resource may have multiple available channels that can alternately be utilized, such as if a particular channel is being used by another resource for wireless communication. As referenced above, a channel may refer to a particular portion of a frequency band, such as a channel and/or sub-channel in a particular frequency range.

According to one or more embodiments, a channel and/or channels for a resource can be determined by the resource itself, e.g., via logic employed by a resource. Alternatively or additionally, a channel and/or channels can be assigned for a resource by a different entity. For instance, the broker module 118 can assign a channel to a resource based on a variety of factors. One such factor can be channel availability, such as based on which channels are currently in use and/or assigned to a different resource. Consider a scenario, for example, where the broker module 118 is determining a channel to be used by a particular resource. If the broker module 118 determines that a channel is currently in use by another resource, the broker module 118 can assign a different channel for use by the particular resource.

Another factor can be channel quality. For instance, if a particular channel is determined to be noisy, a different channel can be selected for a resource. A variety of other factors may be considered in determining a wireless channel for a particular resource.

The resource table 400 further includes a polling interval column 408, which specifies how frequently a particular resource will check for data being transmitted wirelessly to the resource, such as part of a connection request.

The information included in the resource table 400 is presented for purpose of illustration only, and embodiments can be employed to specify a wide variety of different resource information for a wide variety of different resources and resource types. As referenced above, for instance, the resource table 400 can track different types of modulation using by devices, types of error correction coding, and so forth.

Figure 5:
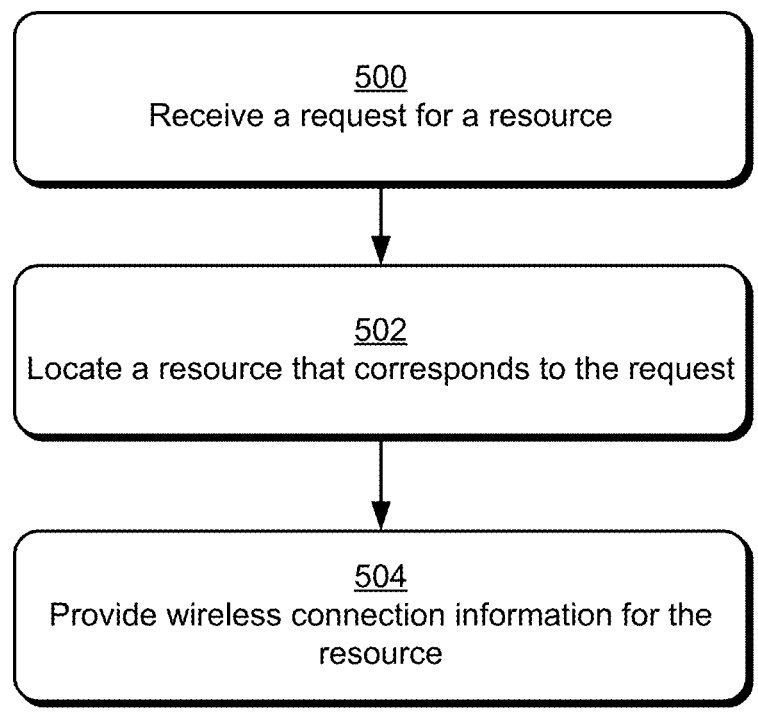
FIG. 5 is a flow diagram that describes steps in a method in accordance with one or more embodiments.

FIG. 5 is a flow diagram that describes steps in a method in accordance with one or more embodiments. Step 500 receives a request for a resource. The broker device 116, for instance, can receive a request from the computing device 102 for wireless connection information for a resource. The request can include a resource type, such as for a printer, a display device, an audio output device, and so on, without including an identifier for a particular instance of the resource. Alternatively, the request can include an identifier for a particular instance of a resource, e.g., a MAC address.

Step 502 locates a resource that corresponds to the request. For instance, the resource table 400 can be queried with information included with the request to locate a resource that complies with the request. If the request seeks a resource of a particular type (e.g., does not identify a particular resource instance), a resource instance can be located that matches the resource type. For example, a resource that is not currently busy (e.g., being accessed by another device) can be identified.

Step 504 provides wireless connection information for the resource. The wireless connection information, for instance, can be transmitted for receipt by a device to enable the device to communicate wirelessly with the resource. Thus, techniques discussed herein can enable a wide variety of different resources to be tracked, and can broker wireless data communication with the resources.

Having discussed some example implementation scenarios, consider now a discussion of an example system and device in accordance with one or more embodiments.

Example System and Device

Figure 6:
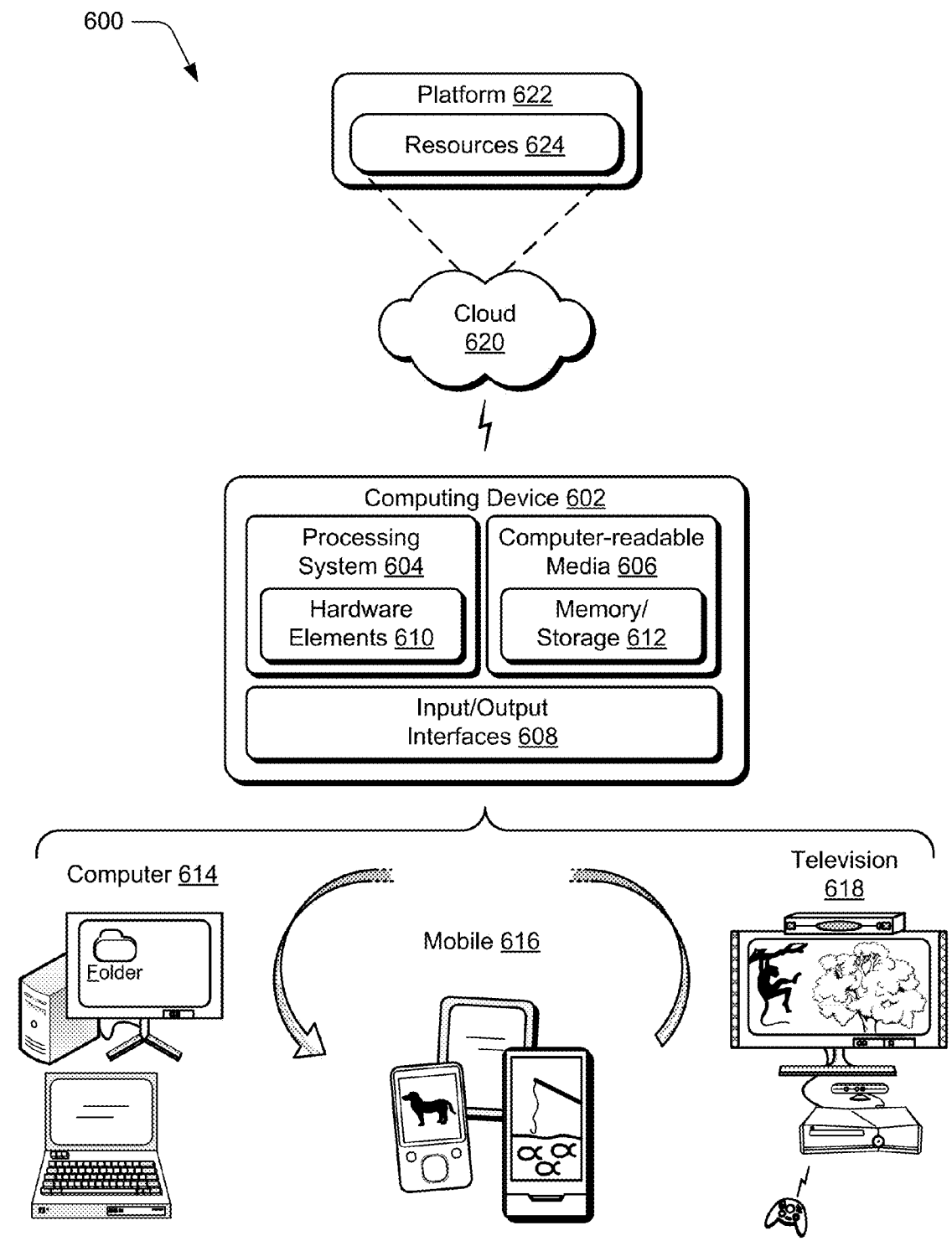
FIG. 6 illustrates an example system and computing device as described with reference to FIG. 1, which are configured to implement embodiments of techniques described herein.

FIG. 6 illustrates an example system generally at 600 that includes an example computing device 602 that is representative of one or more computing systems and/or devices that may implement various techniques described herein. For example, the computing device 102 discussed above with reference to FIG. 1 can be embodied as the computing device 602. The computing device 602 may be, for example, a server of a service provider, a device associated with the client (e.g., a client device), an on-chip system, and/or any other suitable computing device or computing system.

The example computing device 602 as illustrated includes a processing system 604, one or more computer-readable media 606, and one or more I/O Interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone (e.g., for implementing voice and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Thus, computer-readable storage media does not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of modules as an module that is executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 602 may assume a variety of different configurations, such as for computer 614, mobile 616, and television 618 uses. Each of these configurations includes devices that may have generally different constructs and capabilities, and thus the computing device 602 may be configured according to one or more of the different device classes. For instance, the computing device 602 may be implemented as the computer 614 class of a device that includes a personal computer, desktop computer, a multi-screen computer, laptop computer, netbook, and so on.

The computing device 602 may also be implemented as the mobile 616 class of device that includes mobile devices, such as a mobile phone, portable music player, portable gaming device, a tablet computer, a multi-screen computer, and so on. The computing device 602 may also be implemented as the television 618 class of device that includes devices having or connected to generally larger screens in casual viewing environments. These devices include televisions, set-top boxes, gaming consoles, and so on.

The techniques described herein may be supported by these various configurations of the computing device 602 and are not limited to the specific examples of the techniques described herein. For example, functionalities discussed with reference to the client wireless module 104, the device wireless module 112, and/or the broker module 118 may be implemented all or in part through use of a distributed system, such as over a "cloud" 620 via a platform 622 as described below.

The cloud 620 includes and/or is representative of a platform 622 for resources 624. The platform 622 abstracts underlying functionality of hardware (e.g., servers) and software resources of the cloud 620. The resources 624 may include applications and/or data that can be utilized while computer processing is executed on servers that are remote from the computing device 602. Resources 624 can also include services provided over the Internet and/or through a subscriber network, such as a cellular or Wi-Fi™ network.

The platform 622 may abstract resources and functions to connect the computing device 602 with other computing devices. The platform 622 may also serve to abstract scaling of resources to provide a corresponding level of scale to encountered demand for the resources 624 that are implemented via the platform 622. Accordingly, in an interconnected device embodiment, implementation of functionality described herein may be distributed throughout the system 600. For example, the functionality may be implemented in part on the computing device 602 as well as via the platform 622 that abstracts the functionality of the cloud 620.

Discussed herein are a number of methods that may be implemented to perform techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

Conclusion

Techniques for connection information for inter-device wireless data communication are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. One or more computer-readable storage devices comprising instructions stored thereon that, responsive to execution by a broker device, cause the broker device to perform operations comprising:
   receiving, at the broker device, a request from a requesting device for a hardware wireless resource, the request including a resource type but not an identifier for a particular instance for the hardware wireless resource;
   locating an instance of the hardware wireless resource that corresponds to the request;
   identifying multiple channels that are pre-assigned to the instance of the hardware wireless resource;
   ascertaining that a first channel of the multiple channels is currently in use by another resource;
   assigning, responsive to said ascertaining, a second channel of the multiple channels to the instance of the hardware wireless resource;
   determining a polling interval that indicates how frequently the hardware wireless resource is configured to check for data being transmitted to the hardware wireless resource; and
   transmitting, for receipt by the requesting device, wireless connection information for the instance of the hardware wireless resource including the polling interval and the second channel to enable the requesting device to establish wireless data communication with the instance of the hardware wireless resource, the instance of the hardware wireless resource and the requesting device being remote from the broker device.

2. One or more computer-readable storage devices as recited in claim 1, wherein said locating the instance of the hardware wireless resource comprises searching a resource table that tracks wireless connection information for multiple hardware wireless resources.

3. One or more computer-readable storage devices as recited in claim 1, wherein the resource type indicates an input/output (I/O) device type, and wherein the instance of the hardware wireless resource corresponds to an instance of the I/O device type.

4. One or more computer-readable storage devices as recited in claim 1, wherein the wireless connection information further includes a type of error correction coding utilized by the instance of the hardware wireless resource.

5. One or more computer-readable storage devices as recited in claim 1, wherein the wireless connection information is configured to enable the requesting device to establish a direct wireless connection with the instance of the hardware wireless resource.

6. A broker system comprising:
a processing system; and
one or more computer-readable storage media storing instructions that are executable by the processing system to perform operations including:
managing wireless connection information for multiple hardware wireless resources, the wireless connection information including one or more wireless channels via which respective instances of the hardware wireless resources may be accessed and a polling interval that indicates how frequently the hardware wireless resource is configured to check for data being transmitted to the hardware wireless resource; and
providing the wireless connection information, by the broker system and via a proactive notification independent of a query, for at least one of the hardware wireless resources to a computing device, the wireless connection information configured to enable direct wireless data communication between the at least one of the hardware wireless resources and the computing device, the at least one of the hardware wireless resources and the computing device being remote from the broker system.

7. A broker system as described in claim 6, wherein the wireless connection information for the at least one of the hardware wireless resources is received by the system from the at least one of the hardware wireless resources.

8. A broker system as described in claim 6, wherein the wireless connection information for the at least one of the hardware wireless resources comprises one or more wireless channels assigned by the system to the at least one of the hardware wireless resources for wireless data communication.

9. A broker system as described in claim 6, wherein the at least one of the hardware wireless resources comprises an input/output (I/O) device that is configured to perform at least one of providing input to or receiving input from the computing device.

10. A computer-implemented method comprising:
receiving, at a broker device, a request from a requesting device for a hardware wireless resource, the request including a resource type but not an identifier for a particular instance of the hardware wireless resource;
locating an instance of the hardware wireless resource that corresponds to the request;
assigning one or more wireless channels to the instance of the hardware wireless resource;
determining a polling interval that indicates how frequently the hardware wireless resource is configured to check for data being transmitted to the hardware wireless resource; and
transmitting, for receipt by the requesting device, wireless connection information for the instance of the hardware wireless resource including the polling interval and the one or more assigned channels to enable a device to establish wireless data communication with the instance of the hardware wireless resource.

11. A computer-implemented method as recited in claim 10, wherein the request for the hardware wireless resource comprises a query from the requesting device for the hardware wireless resource.

12. A computer-implemented method as recited in claim 10, wherein said locating comprises locating the instance of the hardware wireless resource by searching a resource table that tracks wireless connection information for multiple hardware wireless resources.

13. A computer-implemented method as recited in claim 10, wherein the resource type indicates an input/output (I/O) device type, and wherein the instance of the hardware wireless resource corresponds to an instance of the I/O device type.

14. A computer-implemented method as recited in claim 10, wherein the wireless connection information includes one or more wireless channels via which the wireless data communication can be established with the instance of the hardware wireless resource.

15. A computer-implemented method as recited in claim 10, wherein the wireless connection information further includes a type of error correction coding utilized by the instance of hardware the wireless resource.

16. A computer-implemented method as recited in claim 10, wherein the wireless connection information is configured to enable the device to establish a direct wireless connection with the instance of the hardware wireless resource.

17. One or more computer-readable storage devices as recited in claim 1, wherein said assigning the second channel is further based on channel quality of the second channel.

18. A broker system as described in claim 6, wherein the broker system is configured as a wireless router.

19. A computer-implemented method as recited in claim 10, wherein said assigning of one or more channels is based on channel quality of the one or more channels.

20. A broker system as described in claim 6, wherein said transmitting further comprises transmitting, by the broker system and via a proactive notification to the computing device, a resource table that includes the wireless connection information for the at least one of the hardware wireless resources as well as other wireless connection information for at least one other hardware wireless resource of the multiple hardware wireless resources.

* * * * *